United States Patent [19]

Hogenkamp

[11] Patent Number: 5,715,930
[45] Date of Patent: Feb. 10, 1998

[54] DELIVERY APPARATUS FOR ARTICLES ENTERING IN TRANSVERSE ROWS ON A CIRCULATING ENDLESS FEED BELT

[75] Inventor: Wilhelm Hogenkamp, Hanover, Germany

[73] Assignee: Wilhelm Hogenkamp Verpackungstechnik, Hanover, Germany

[21] Appl. No.: 548,489

[22] Filed: Oct. 26, 1995

[30] Foreign Application Priority Data

Oct. 26, 1994 [DE] Germany ............... 44 38 207.3

[51] Int. Cl.$^6$ ............................................. B65G 47/26
[52] U.S. Cl. ............... 198/435; 198/468.6; 198/369.7; 198/369.6; 198/370.01
[58] Field of Search ................. 108/363, 369.6, 108/369.7, 370.01, 468.9, 468.6, 435

[56] References Cited

U.S. PATENT DOCUMENTS

| 3,605,982 | 9/1971 | Adler . |
| 4,499,988 | 2/1985 | Gasser ............... 198/369.7 |
| 4,541,824 | 9/1985 | Müller ............... 198/435 |
| 4,867,299 | 9/1989 | Fukuoka et al. . |
| 5,499,719 | 3/1996 | Lindee et al. ............... 198/435 |

FOREIGN PATENT DOCUMENTS

| 0558123 | 2/1993 | European Pat. Off. . |
| 268144 | 1/1969 | Germany . |
| 1917062 | 4/1969 | Germany . |
| 2133389 | 1/1973 | Germany ............... 198/435 |
| 2831323 | 7/1978 | Germany . |

*Primary Examiner*—William E. Terrell
*Assistant Examiner*—Khoi H. Tran
*Attorney, Agent, or Firm*—Thomas, Kayden, Horstemeyer & Risley

[57] ABSTRACT

A delivery apparatus for articles (5), in particular items of confectionary such as chocolate bars, chocolates or the like, entering in transverse rows on a circulating endless feed belt (1) at at least two processing locations provides that the feed belt has arranged downstream of it, on the one hand, a passing-on belt (14), operating, in particular, at the same level and in the same conveying direction, and, on the other hand, a discharge belt (7), arranged outside the plane of the feed belt, (1). There is provided, between the feed belt (1) and discharge belt (7), a transfer belt (9) which is driven such that it can move back and forth between a connection to the feed belt (1) and a connection to the discharge belt (7). That end of the feed belt (1) which faces the passing-on belt (14) and the transfer belt (9) is arranged in a stationary manner. At least the beginning (18) facing the end of the feed belt (1), of the passing-on belt (14) can be pivoted about an axis (16) extending transversely with respect to the conveying direction (6). The transfer belt (9) and the passing-on belt (14) are coupled mechanically, and provision is made for a common pivot drive (20) for the movements of the transfer belt (9) and of the passing-on belt (14).

10 Claims, 3 Drawing Sheets

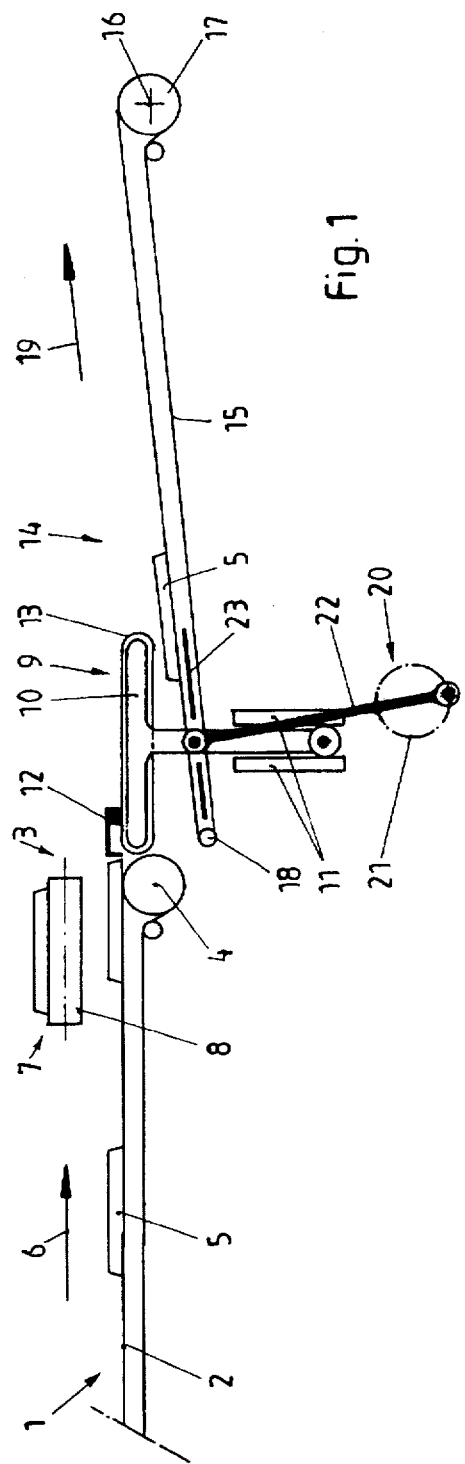
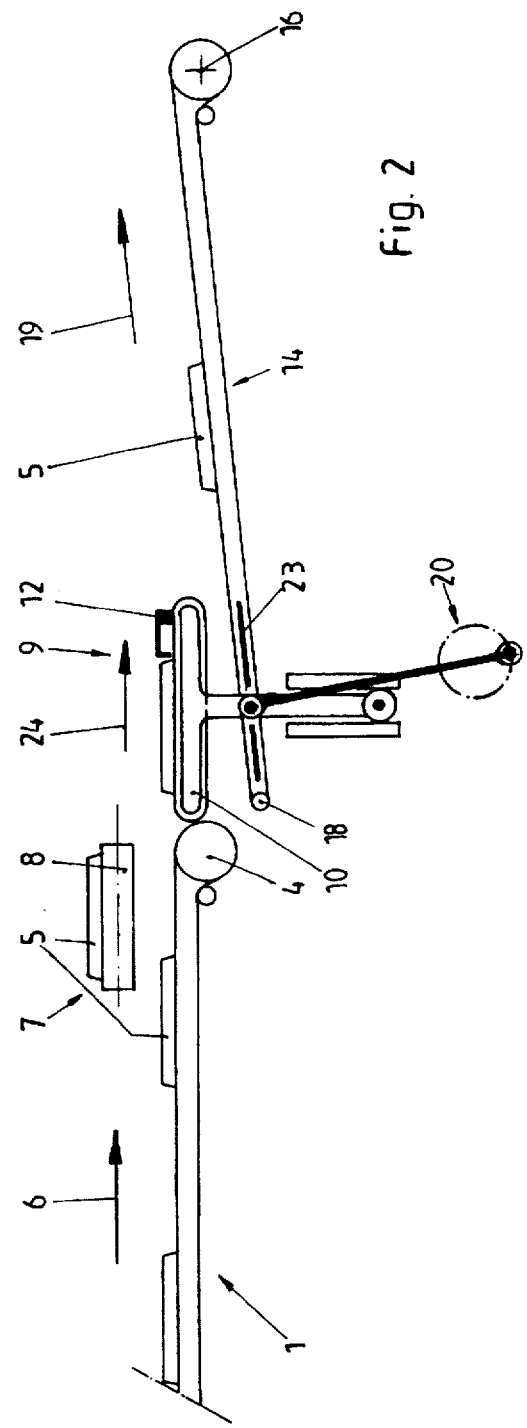

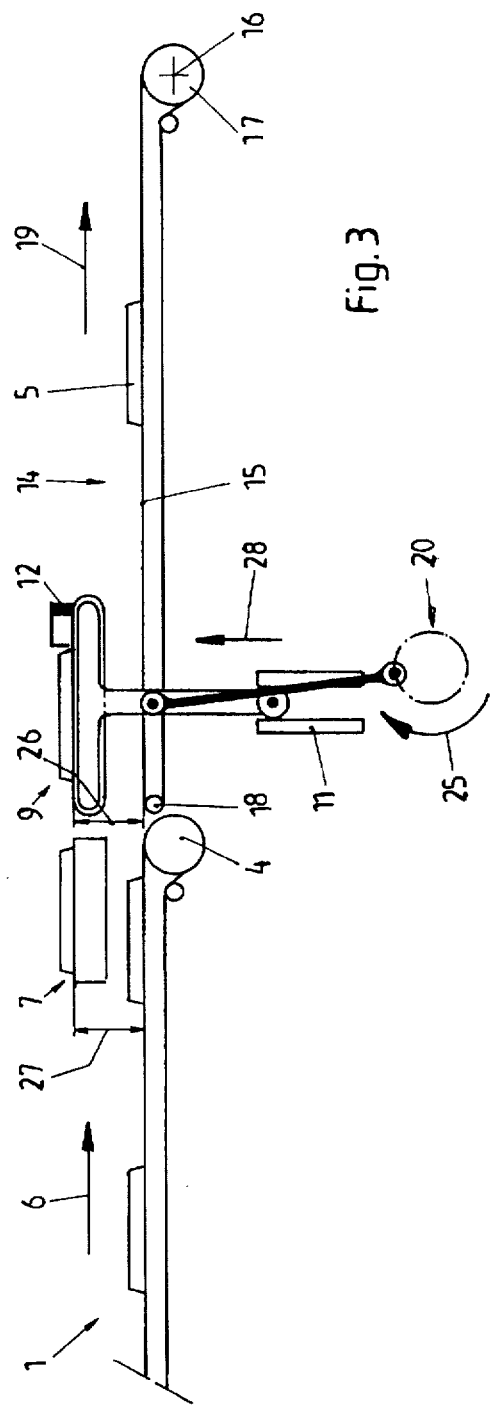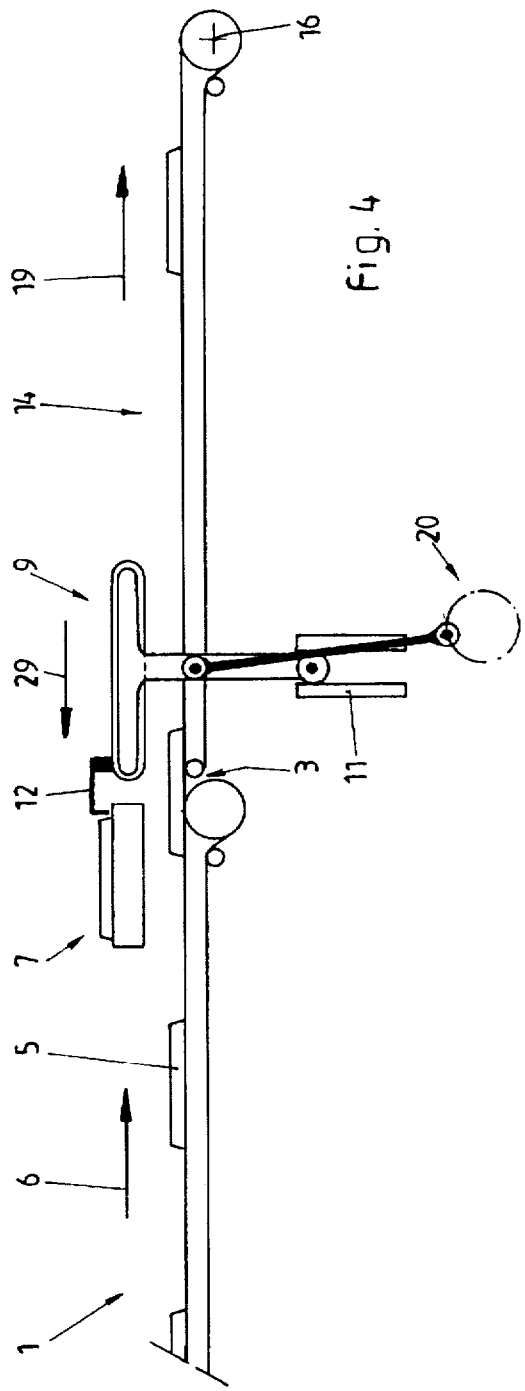

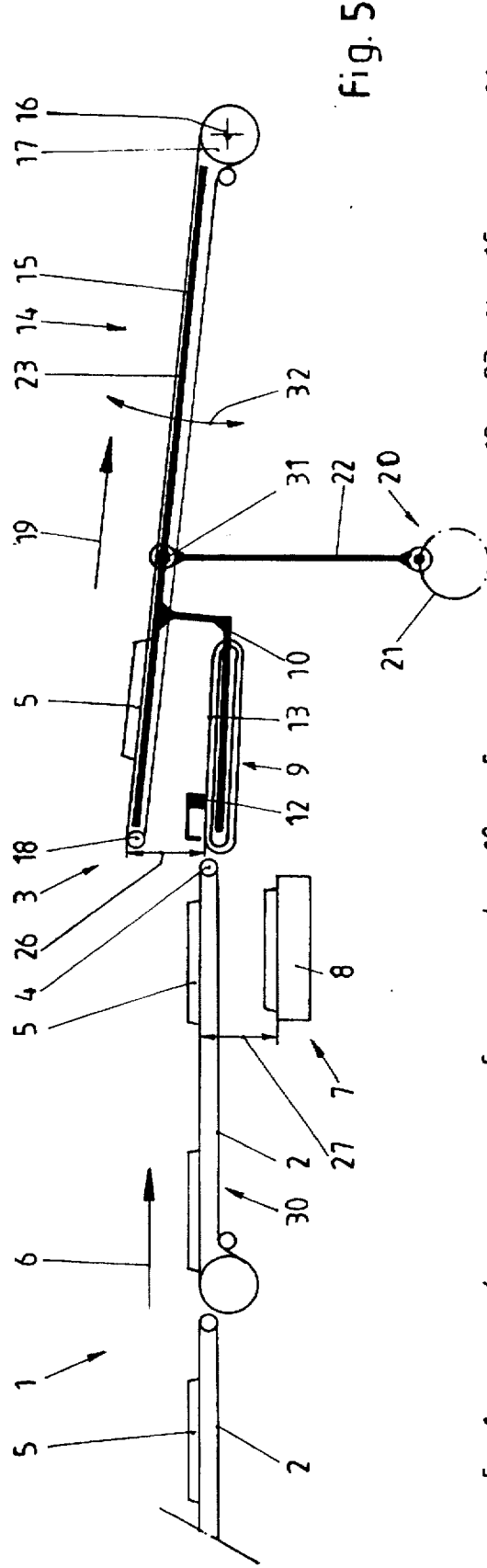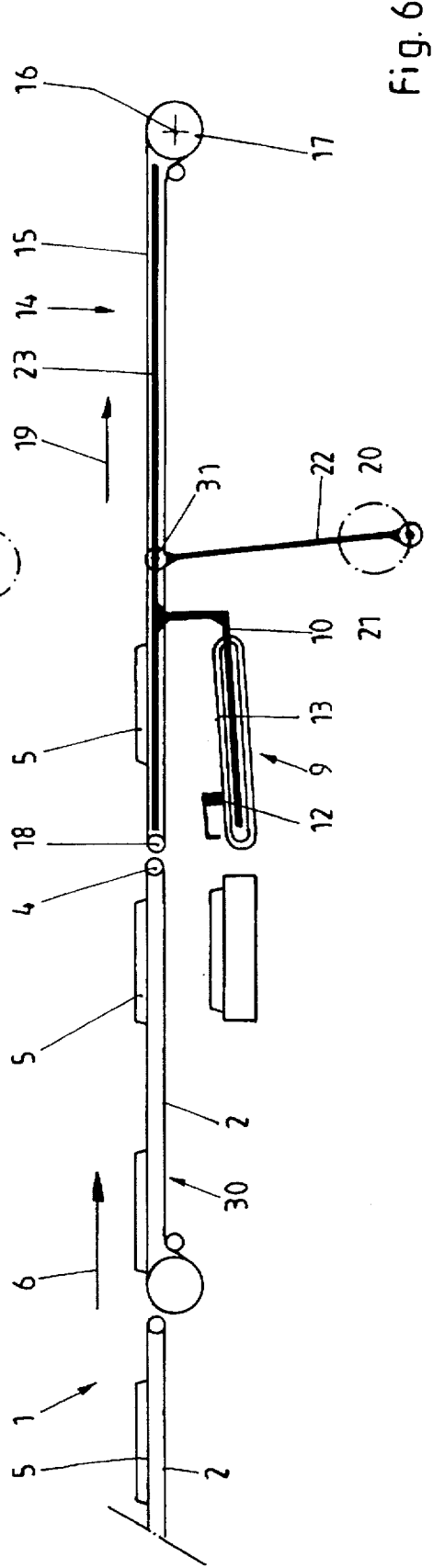

DELIVERY APPARATUS FOR ARTICLES ENTERING IN TRANSVERSE ROWS ON A CIRCULATING ENDLESS FEED BELT

FIELD OF THE INVENTION

The invention relates to a delivery apparatus for articles, in particular items of confectionary such as chocolate bars, chocolates or the like, entering in transverse rows on a circulating endless feed belt at at least two processing locations, the feed belt having arranged downstream of it, on the one hand, a passing-on belt, operating, in particular, at the same level and in the same conveying direction, and, on the other hand, a discharge belt, arranged outside the plane of the feed belt, end there being provided, between the feed belt and discharge belt, a transfer belt which is driven such that it can move back and forth between a connection to the feed belt and a connection to the discharge belt. Such a delivery apparatus is used, in particular, upstream of the series of packing machines onto which a stream of articles entering in transverse rows on a feed belt has to be divided. In plan view, the discharge belt assumes an angle of 90° relative to the feed belt. The aim is to permit, on the discharge belt, an uninterrupted row of articles for continuous operation of the packing machine or of another processing location.

BACKGROUND OF THE INVENTION

A delivery apparatus of the type described in the introduction is known from DE 28 31 323 C2. At its ends facing the conveying direction, the feed belt exhibits a lug which can be pivoted downwards. Provision is made for a transfer belt which can be changed in length and can be pivoted into two positions about an axis which can be pivoted transversely with respect to the conveying direction, it being possible, in one position, for the transfer belt to be in connection with the lowered lug of the feed belt and thus to receive articles, while, in the other position, said transfer belt is in connection with the discharge belt and can thus supply articles to discharge belt. When the lug of the feed belt is not lowered, it is in connection with a passing-on belt, which adjoins the feed belt in a horizontal conveying plane. Advantageously, the articles thus pass onto the passing-on belt from the feed belt without being positioned in a sloping manner. Upstream of the processing location, however, the articles have to be conveyed in the downwardly lowered part of the passing-on belt and on the transfer belt in a sloping position. Depending on the design of the articles, it is not possible for said sloping angle to be selected as required, because it is necessary to maintain the transverse-row alignment of the articles during delivery as well. The arrangement of the transfer belt and of the discharge belt beneath the conveying plane of the feed belt end of the passing-on belt means that there is only a restricted view, it being necessary, however, to have an overall view when operational disturbances have to be eliminated or cleaning work has to be carried out. The arrangement of the transfer belt, of its necessary pivot drive and of its mounting, which can be changed in length, means that the length of the passing-on belt is necessarily relatively long in the conveying direction, with the result that this unit of the delivery apparatus is a relatively long construction. However, the known delivery apparatus consistently pursues the idea of dividing a stream of articles by a diverter-like movement of the end of the feed belt itself. Corresponding sensing and control means are provided for the coordinated movements of the drives of the belts.

A further delivery apparatus is known from AT 268 144. Here, the feed belt is designed in a divided manner, in particular in order to be able to pivot it, in the manner of a diverter, upwards into a sloping position. However, the divided-off end of the feed belt may also be pivoted into a downwardly oriented sloping position if the plane of the discharge belt is arranged beneath the plane of the feed belt and of the passing-on belt. The transfer belt which is provided in each case operates as a circulating belt in the conveying direction. It is itself, once again, designed in a divided manner in order that its beginning, facing the end of the feed belt, can be pivoted from a horizontal position into a sloping position and vice versa. The passing-on belt, which follows in the conveying plane, is also designed in a divided manner, and its part which faces that end of the feed belt which can be pivoted in the manner of a diverter can likewise be pivoted from a horizontal position into a sloping position about an axis extending transversely with respect to the conveying direction. Although, in this sloping position, it is not possible for any articles to be received, the consequently enlarged through-passage cross-section has proved to be advantageous, in particular, for relatively high articles. A rocker-like linkage with a drive is provided in order to be able to pivot in opposite directions the divided-off ends of the feed belt, on the one hand, and of the discharge belt and of the passing-on belt, on the other hand, with the result that the articles entering one behind the other may, in this manner, be distributed onto two conveying planes. The transfer belt used here is not driven such that it can move back and forth, but is designed as an endlessly circulating belt. Consequently, it requires a belt guide.

SUMMARY OF THE INVENTION

The object of the invention is to provide a delivery apparatus of the type described in the introduction, which requires reduced structural outlay. In particular, the intention is that, despite the use of a transfer belt which can move back and forth, the delivery apparatus is to exhibit only one pivot drive.

According to the invention, this is achieved, in the case of the delivery apparatus of the type described in the introduction, in that that end of the feed belt which faces the passing-on belt and the transfer belt is arranged in a stationary manner, in that at least the beginning, facing the end of the feed belt, of the passing-on belt can be pivoted about an axis extending transversely with respect to the conveying direction, and in that the transfer belt and the passing-on belt are coupled mechanically, and provision is made for a common pivot drive for the movements of the transfer belt and of the passing-on belt.

The invention departs from the idea that the end of the feed belt has to be pivotable for dividing a stream of articles. Since the discharge belt, in any case, is not pivotable, but is merely arranged in a plane located outside the conveying plane of the feed belt and of the passing-on belt, the invention is based on the idea of leaving the end of the feed belt stationary and, as it were, configuring only the beginnings, arranged downstream ok the delivery location, of the passing-on belt, on the one hand, and of the transfer belt, on the other hand, to be pivotable. This produces the advantage that only one, common pivot drive is necessary and, in addition, a counter-running distributor gear mechanism can be dispensed with. Consequently, the structural outlay is, at the same time, reduced considerably, and the entire delivery apparatus can be produced less expensively than hitherto. In particular when the transfer belt is arranged above the passing-on belt, it is possible to obtain a good overall view of the elements of the delivery apparatus, so that one can intervene easily and quickly in the event of operational disturbances. The possibilities for cleaning are also improved, without any special design features being necessary for this purpose, e.g. upwardly pivotable beginnings of belts or the like. The articles delivered at the various processing locations are only moved once into a sloping position and are only pivoted once. In the event of a direct transfer from the end of the feed belt to the beginning of the passing-on belt, any sloping position of the articles is avoided.

The passing-on belt may also be designed as a divided belt. The same applies for the feed belt. The division of said belts requires a certain degree of outlay in design terms and, in particular, also the arrangement of separate drives for the parts of the belts if the parts of the belts are to be controlled differently, for example in order to close up gaps between the transverse rows.

The transfer belt and at least the pivotable part of the passing-on belt can be coupled mechanically in a fixed manner, in particular can be arranged on a common frame. The common pivot drive then acts on said frame and produces, in one position, both connection of the transfer belt to the discharge belt and connection of the passing-on belt to the feed belt. In the other position, the transfer belt is merely in connection with the feed belt. There is no need for separate mounting for the transfer belt. The pivot axis of the passing-on belt is expediently used here. The transfer belt has, in any case, only a relatively small extent in the conveying direction. The movement back and forth of the transfer belt—in contrast to a belt which circulates endlessly means that the belt itself may be of a very simple design, a special belt guide being avoided.

On the other hand, however, the transfer belt and at least the pivotable part of the passing-on belt may also be coupled mechanically in a movable manner, translatory, in particular vertically acting, guide elements being provided for the movement of the transfer belt in approximately the vertical direction. This produces the advantage that the articles on the transfer belt assume a horizontally aligned position at any one time and a sloping position is avoided. This can be seen, in particular, in conjunction with the movement back and forth of the transfer belt itself, that is to say when articles are received, on the one hand, and discharged, on the other hand. A connecting rod with corresponding articulations may be provided as mechanically movable connecting means. The pivot movement of the passing-on belt and the vertical movement of the transfer belt have to be coordinated with one another.

The common drive for the movements of the transfer belt, on the one hand, and of the passing-on belt, on the other hand, becomes particularly simple if a crank mechanism is provided. Such a crank mechanism has, in addition, a sinusoidal movement, with the result that the approach towards the connection location is advantageously slowed down in comparative terms.

The feed belt may be designed in a divided manner, two separately controllable drives then being provided for the two parts, adjoining one another in the conveying direction, of the feed belt. With corresponding control, this makes it possible to close up gaps between the successive transverse rows. At the last distributing location, even articles which have run over can be conveyed back into the processing operation and thus fed to the last processing location.

The transfer belt may be arranged above beneath the passing-on belt. The two delivery locations between the feed belt and the passing-on belt, on the one hand, and the transfer belt and the discharge belt, on the other hand, are thus provided vertically one above the other, with the result that, all in all, an advantageously short overall length of the entire delivery apparatus is obtained.

The transfer belt may be designed to be shorter in the conveying direction than the passing-on belt. It is only when the transfer belt is also intended to fulfil a storage function and is to receive a plurality of transverse rows that its extent is correspondingly enlarged in the conveying direction. In all these cases, however, it is possible to obtain a good overall view and easier possibilities for cleaning.

The transfer belt may exhibit a guided slide which is connected to a drive, an endless belt being connected to the slide. However, said endless belt does not circulate, but is driven back and forth indirectly via the slide. This means that a belt guide, involving a certain degree of outlay, is dispensed with, and the risk of an endlessly circulating belt running off course is avoided.

The vertical offset of the beginnings of the transfer belt and of the passing-on belt advantageously corresponds with the vertical spacing between the feed belt and discharge belt, with the result that, in a common position, the feed belt is in connection with the passing-on belt and, at the same time, the transfer belt and the discharge belt are also in connection. It is thus possible simultaneously for articles to be passed on and, in another plane, for other articles to be discharged.

If the transfer belt and passing-on belt are coupled in a fixed manner, the frames, coupled to one another mechanically in a fixed manner, of the passing-on belt and of the transfer belt may be arranged at an angle with respect to one another. Said angle expediently corresponds to half the angle of the sloping position in the event of horizontal alignment. Consequently, the possible sloping position of the articles is reduced and a short overall length is obtained. It is not necessary to design the passing-on belt to be particularly long or to arrange the pivot axis of the passing-on belt at a relatively great distance from the beginning of the passing-on belt.

BRIEF DESCRIPTION OF THE DRAWINGS

The invention is further explained and described with reference to preferred exemplary embodiments. In the drawings:

FIG. 1 shows a schematized side view of a first embodiment of the delivery apparatus before a transverse row of articles is received onto the transfer belt, FIG. 2 shows the relative position of the parts after a transverse row has been received in full on the transfer belt, FIG. 3 shows the relative position of the parts after the transfer belt has been raised, FIG. 4 shows the relative position of the parts after a transverse row has been pushed from the transfer belt onto the discharge belt, FIG. 5 shows a schematized side view of the second embodiment of the delivery apparatus before a transverse row of articles is received onto the transfer belt, and FIG. 6 shows the relative position of the parts after the transfer belt has been lowered.

DETAILED DESCRIPTION

FIG. 1 schematically represents the end of a feed belt 1, whose endlessly circulating belt 2 is wound around a deflection roller 4 in the region of a delivery location 3. A cutter-like belt edge may also be provided instead of the deflection roller 4.

On the feed belt 1, articles 5, located one beside the other in transverse rows, are conveyed in the conveying direction 6. The feed belt 1 has a continuously acting drive (not shown in any more detail). The deflection roller 4, and thus the end of the feed belt 1, is arranged in a stationary manner, with the result that the transverse rows of articles 5 are always fed in at the same point of the delivery location 3.

Provided above the end of the feed belt 1, and thus aligned with respect to the delivery location 3, is a discharge belt 7, which extends essentially perpendicularly with respect to the feed belt 1. The feed belt 7, too, has an endlessly circulating belt 8, which is provided with its own drive. Controlled via corresponding sensing and control means, the discharge belt 7 can receive in each case one transverse row of articles 5, with the result that the articles 5 can then be further conveyed one behind the other in a single row on the discharge belt 7 and fed to a processing location, for example to a packing machine.

As can be seen, the discharge belt 7 is arranged with its conveying plane above the conveying plane above the conveying plane of the feed belt 1. In order to remove the articles 5 from the feed belt 1, and supply them to the discharge belt 7, in transverse rows, provision is made for a transfer belt 9, which exhibits a frame 10, which is designed in the form of a T here. The frame 10 of the transfer belt 9 is assigned guides 11, for example slide rails, with the result that the transfer belt 9 is guided such that it can be moved vertically. The transfer belt 9 exhibits a slide 12, which is provided with its own drive which moves back and forth (not shown in any more detail here). The slide 12 is connected to a belt 13 which is driven indirectly by the slide 12 and thus provides, upstream of the slide 12 in each case, a receiving surface for a transverse row of articles 5 on the frame 10.

Provided beneath the transfer belt 9 is a passing-on belt 14, which exhibits an endless belt 15 which is provided with its own drive. The belt 15 of the passing-on belt 14 can be pivoted about a stationary axis 16 or a deflection roller 17, the beginning 18, facing the delivery location 3, of the passing-on belt 14 moving in an arc of a circle about the axis 16 during a pivot movement. Transverse rows of articles 5 which have not been received by the transfer belt 9 are conveyed further, in accordance with arrow 19, on the passing-on belt 14 and fed to a further delivery apparatus, at which, in turn, transverse rows of articles 5 can branch off, as has been shown and described already for the depicted discharge belt 7.

For the pivot movement of the passing-on belt 14 and vertical movement of the transfer belt 9 with its frame 10, provision is made for a common pivot drive 20, which may exhibit a crank mechanism 21 with a push rod 22. The push rod 22 engages on the frame 10 of the transfer belt 9. It may also engage on the frame 23, which is only partially indicated, of the passing-on belt 14. The two frames 10 and 23 are coupled mechanically, the coupling location being designed in an articulated manner here in order to take account of the differences in movement of the vertical movement of the transfer belt 9 and of the pivot movement of the passing-on belt 14.

The feed belt 1 and the passing-on belt 14 may be designed and arranged as separate parts, as has been described with reference to FIG 1. However, both the feed belt 1 and the passing-on belt 14 may also comprise a plurality of divided belts, in which case the pivotability of the passing-on belt 14 is restricted only to its first part, which is assigned to the delivery location 3. The overall length of a delivery apparatus is determined by the feed belt 1 and the passing-on belt 14 being arranged one behind the other in the conveying direction 6. It is, however, also possible to modify the delivery apparatus such that the feed belt 1 and the passing-on belt 14 constitute one and the same belt, with the result that a further delivery location 3 is provided, as it were, directly downstream of the deflection roller 17. It goes without saying that at least two delivery apparatuses arranged one behind the other are provided if a stream of articles 5 entering in transverse rows is to be divided on at least two further-processing locations.

The mode of operation of a delivery apparatus is described hereinbelow with reference to FIGS. 1 to 4: FIG. 1 shows the lowered position of the transfer belt 9 and of the passing-on belt 14, with the result that the transfer belt 9 is in connection with the end of the feed belt 1. The transverse row of articles 5 which is located directly at the end of the feed belt 1 is intended to be received by the transfer belt 9. For this purpose, the slide 12 is located, with the aid of its drive, in a position facing the delivery location 3, with the result that it can carry out an aligning function as the transverse row is received. As can be seen by comparing FIG. 1 and 2, the slide 12 is moved back, in accordance with arrow 24, in the conveying direction 6 relative to the frame 10 of the transfer belt 9, while the belt 2 of the feed belt 1 is driven on continuously. Accordingly, this transverse row passes onto the transfer belt 9, the slide 12 having reached its other end position when the transverse row is in the position in which it has been received in full (FIG. 2). During this conveying movement, the belt 15 of the passing-on belt 14 has also run on further in accordance with arrow 19, with the result that a row of articles 5 which was previously already located on the passing-on belt 14 has been transported further in a corresponding manner. The same also applies for transverse rows of articles 5 on the feed belt 1.

As can be seen by comparing FIGS. 2 and 3, the common pivot drive 20 has been actuated in accordance with arrow 25, as a result of which the transfer belt 9 has been raised and the passing-on belt 14 has also been pivoted. The vertical offset 26 between the beginnings of the transfer belt 9 and of the passing-on belt 14 corresponds to vertical spacing 27 between the conveying planes of the feed belt 1 and of the discharge belt 7. This ensures that, once the common movement of the transfer belt 9 and of the passing-on belt 14 in accordance with arrow 28 has been completed, the passing-on belt 14 is in connection with the feed belt 1 and, at the same time, the transfer belt 9 and the discharge belt 7 may be in connection (FIG. 3).

As can be seen by comparing the representations of FIGS. 3 and 4, it is thus possible simultaneously to push a transverse row of articles from the transfer belt 9 onto the discharge belt 7 in accordance with arrow 29, for which purpose the drive of the slide 12 is controlled correspondingly. At the same time, another transverse row of articles 5 can be transferred at the delivery location 3 between the end of the feed belt 1 and beginning 18 of the passing-on belt 14 and can be conveyed further from the passing-on belt 14 in the direction of arrow 19.

The mode of operation then continues correspondingly at a delivery apparatus arranged downstream.

A further embodiment of the delivery apparatus is represented in FIGS. 5 and 6, the discharge belt 7 not being arranged above the conveying plane of the feed belt 1 and passing-on belt 14, but being arranged beneath said plane.

The feed belt 1 is designed in a divided manner in order to be able to close up gaps between the transverse rows of the articles 5. For this purpose, the circulating belt 2 has arranged downstream of it a partial feed belt 30, which likewise exhibits a circulating belt 2. The partial feed belt 30 is provided with a separately controllable drive (not shown here). Here, too, the deflection roller 4 of the belt 2 of the partial feed belt 30 is arranged in a stationary manner. The articles 5 are advanced to the delivery location 3 in transverse rows in the conveying direction 6. The discharge belt 7, arranged beneath the conveying plane, exhibits, here too, a circulating belt 8 with its own drive. The transfer belt 9 has a frame 10, which is connected to the frame 23 of the passing-on belt 14 in a fixed manner. A common frame as provided, as it were, the frame 10 being arranged such that its main plane is inclined at an angle with respect to the main plane of the frame 23, which angle corresponds to half the angle by which the passing-on belt 14 is pivoted about its axis 16. Here, too, the transfer belt 9 has a slide 12 and a belt 13 fastened thereon. The passing-belt 14 also has a circulating belt 15 here. The axis 16 about which the passing-on belt 14 can be pivoted As realized by a deflection roller 17. The beginning 18 of the passing-on belt 14 is raised in the receiving position shown in FIG. 5, with the result that the transverse row of articles 5 which is located on the circulating belt 15 of the passing-on belt 14 is conveyed further in accordance with arrow 19. The transfer belt 9 is ready for receiving the next transverse row of articles 5 supplied via the partial feed belt 30 and the deflection roller 4. Here, too, the pivot drive 20 has a crank mechanism 21 with a push rod 22, which engages in a pivot bearing 31 on the common frame of the frame 10 of the transfer belt and of the frame 23 on the passing-on belt. This means that the unit, comprising transfer belt 9 and passing-on belt 14, can be pivoted about the axis 16 in accordance with the double arrow 32. Here, too, the offset 26 corresponds to the spacing 27 between the conveying planes of the feed belt 1 and of the discharge belt 7, with the result that that relative position of the parts which is represented in FIG. 6 is reached after approximately a half revolution of the pivot drive 20 out of FIG. 5. In this arrangement, the transverse belt 9 is in connection with the discharge belt 7, and the passing-on belt 14 is in connection with the feed belt 1 and partial feed belt 30. It can be seen by comparing FIGS. 5 and 6 that the transfer belt 9 slopes only to a very slight extent in the two positions. The pivot axis is located on the axis 16 and not, for example, in the conveying plane of the discharge belt 7.

While the foregoing specification and the drawings illustrate and describe a preferred embodiment of the invention, it will be understood by those skilled in the art that variations and modifications thereof can be made without departing from the spirit and scope of the invention, as set forth in the following claims.

LIST OF DESIGNATIONS

1—Feed belt
2—Belt
3—Delivery location
4—Deflection roller
5—Article
6—Conveying direction
7—Discharge belt
8—Belt
9—Transfer belt
10—Frame
11—Guide
12—Slide
13—Belt
14—Passing-on belt
15—Belt
16—Axis
17—Deflection roller
18—Beginning
19—Arrow
20—Pivot drive
21—Crank mechanism
22—Push rod
23—Frame
24—Arrow
25—Arrow
26—Offset
27—Spacing
28—Arrow
29—Arrow
30—Partial feed belt
31—Pivot bearing
32—Double arrow

I claim:

1. Delivery apparatus for articles (5), having a circulating endless feed belt for moving items of confectionary in transverse rows at least two processing locations, the feed belt (1) having arranged downstream of it, on the one hand, a passing-on belt (14), operating, in particular, at the same level and in the same conveying direction (6), and on the other hand, a discharge belt (7) arranged outside a plane of the feed belt (1), and there being provided, between the feed belt (1) and discharge belt (7), a transfer belt (9) which moves back and forth between a connection to the feed belt (1) and a connection to the discharge belt (7), characterized in that an end of the feed belt (1) which faces the passing-on belt (14) and the transfer belt (9) is arranged in a stationary manner, in that at least a beginning (18), of the passing-on belt (14) which faces the end of the feed belt (1) pivots about an axis (16) extending transversely with respect to the conveying direction (6), and in that the transfer belt (9) and the passing-on belt (14) are coupled mechanically and having a common pivot drive (20) for the movements of the transfer belt (9) and of the passing-on belt (14).

2. Delivery apparatus according to claim 1, characterized in that the transfer belt (9) and at least a pivotable part of the passing-on belt (14) are coupled mechanically in a fixed manner, in particular are arranged on a common frame.

3. The delivery apparatus according to claim 1, characterized in that the transfer belt (9) and at least pivotable parts of the passing-on belt (14) are coupled mechanically in a movable manner, and guide elements (11) are provided for the movement of the transfer belt (9) in approximately a vertical direction.

4. Delivery apparatus according to claim 1, characterized in that the feed belt (1) is designed in a divided manner, and in that two separately controllable drives are provided for the two parts, adjoining one another in the conveying direction (6), of the feed belt (1).

5. Delivery apparatus according to claim 1, characterized in that the transfer belt (9) is arranged above or beneath the passing-on belt (14).

6. Delivery apparatus according to claim 5, characterized in that the transfer belt (9) is designed to be shorter in the conveying direction than the passing-on belt (14).

7. Delivery apparatus according to claim 1, characterized in that the transfer belt (9) exhibits a guided slide (12) which is connected to a drive, and in that an endless belt (13) is connected to the slide (12).

8. Delivery apparatus according to claim 1, characterized in that a vertical offset (26) of the beginnings of the transfer belt (9) and of the passing-on belt (14) corresponds with the vertical spacing (27) between the feed belt (1) and discharge belt (7).

9. Delivery apparatus according to claim 2, characterized in that a crank mechanism (21) is provided as a common drive (20) for the movements of the transfer belt (9) and of the passing-on belt (14).

10. Delivery apparatus according to claim 2, characterized in that the frames (10, 23), coupled to one another mechanically in a fixed manner, of the passing-on belt (14) and of the transfer belt (9) are arranged at an angle with respect to one another.

* * * * *